(12) United States Patent
Tsorng et al.

(10) Patent No.: US 12,422,902 B2
(45) Date of Patent: Sep. 23, 2025

(54) DIVIDER WALL ASSEMBLY INCLUDING COUPLING ROD AND COMPUTING SYSTEM INCLUDING THE SAME

(71) Applicant: Quanta Computer Inc., Taoyuan (TW)

(72) Inventors: Yaw-Tzorng Tsorng, Taoyuan (TW);
Jen-Jia Liou, Taoyuan (TW);
Chun-Chen Hsu, Taoyuan (TW);
Hsi-Chi Chien, Taoyuan (TW);
Yu-Tung Yang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 252 days.

(21) Appl. No.: 18/212,381

(22) Filed: Jun. 21, 2023

(65) Prior Publication Data
US 2024/0345634 A1    Oct. 17, 2024

Related U.S. Application Data

(60) Provisional application No. 63/495,452, filed on Apr. 11, 2023.

(51) Int. Cl.
*G06F 1/00* (2006.01)
*G06F 1/18* (2006.01)

(52) U.S. Cl.
CPC .............. *G06F 1/181* (2013.01); *G06F 1/189* (2013.01)

(58) Field of Classification Search
CPC .......... G06F 1/181; G06F 1/189; G06F 1/187; F16B 5/0088; F16B 5/0614;
(Continued)

(56) References Cited

U.S. PATENT DOCUMENTS

| | | | | |
|---|---|---|---|---|
| 2,743,774 A | * | 5/1956 | Pinto | A47B 88/90 220/551 |
| 2,934,214 A | * | 4/1960 | Mogulescu | A47F 5/10 211/184 |

(Continued)

FOREIGN PATENT DOCUMENTS

| CN | 206629365 U | * | 11/2017 |
|---|---|---|---|
| CN | 118502558 A | * | 8/2024 |

(Continued)

*Primary Examiner* — Janet M Wilkens
(74) *Attorney, Agent, or Firm* — NIXON PEABODY LLP

(57) ABSTRACT

A computing system is disclosed. The computing system includes a housing configured to receive a plurality of electronic components including a first electronic component and a second electronic component; and a divider wall assembly mounted to the housing to separate the first electronic component from the second electronic component. The divider wall assembly includes a plurality of sheets including a first sheet and a second sheet, each sheet of the plurality of sheets having a sheet through-hole, a coupling rod positioned between the first and second sheets, the coupling rod having a flat surface formed between cylindrical ends, the coupling rod having a rod through-hole on the flat surface, the rod through-hole being perpendicular to an axis of the coupling rod, and a fastener fixedly attaching the plurality of sheets and the coupling rod, the fastener being inserted through the sheet through-hole of each sheet and the rod through-hole.

19 Claims, 7 Drawing Sheets

(58) Field of Classification Search
CPC .. H05K 7/1487; H05K 7/1421; H05K 7/1488;
H05K 7/1489; H05K 7/183; H05K 7/14;
H05K 7/0217; H05K 7/18; A47B 88/975;
A47B 2088/976; A47B 96/04; A47B
88/969; G11B 33/124; G11B 33/128
USPC ............ 312/223.2, 348.3, 264, 257.1, 265.6,
312/265.5, 223.1, 351, 184; 211/26, 184;
108/60, 61; 361/679.33, 679.02, 679.32,
361/679.34, 679.58, 724, 725, 727;
248/914
See application file for complete search history.

(56) References Cited

U.S. PATENT DOCUMENTS

| | | | | |
|---|---|---|---|---|
| 6,796,541 | B2 * | 9/2004 | Lu ....................... | E05D 11/1007 |
| | | | | 16/342 |
| 2008/0013273 | A1 * | 1/2008 | Bailey ..................... | G06F 1/185 |
| | | | | 361/679.33 |
| 2017/0339799 | A1 * | 11/2017 | Su ........................ | H05K 7/1489 |
| 2018/0116067 | A1 * | 4/2018 | Good .................... | A47B 88/975 |
| 2022/0011831 | A1 * | 1/2022 | Doglio ................... | G06F 1/185 |
| 2024/0410157 | A1 * | 12/2024 | Maderebner .......... | F16B 5/0088 |

FOREIGN PATENT DOCUMENTS

DE           2506616 A1 * 8/1975
JP           H069532     * 2/1994

\* cited by examiner

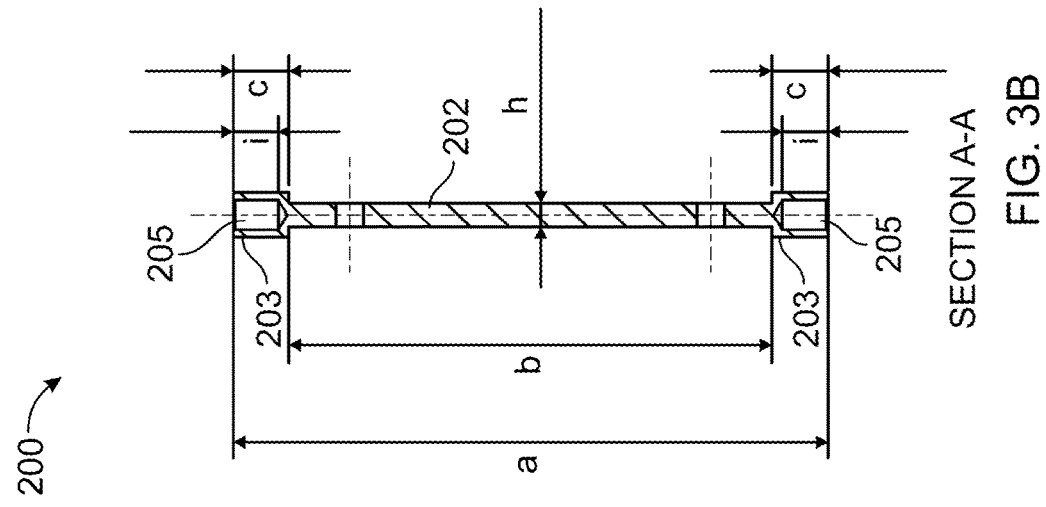
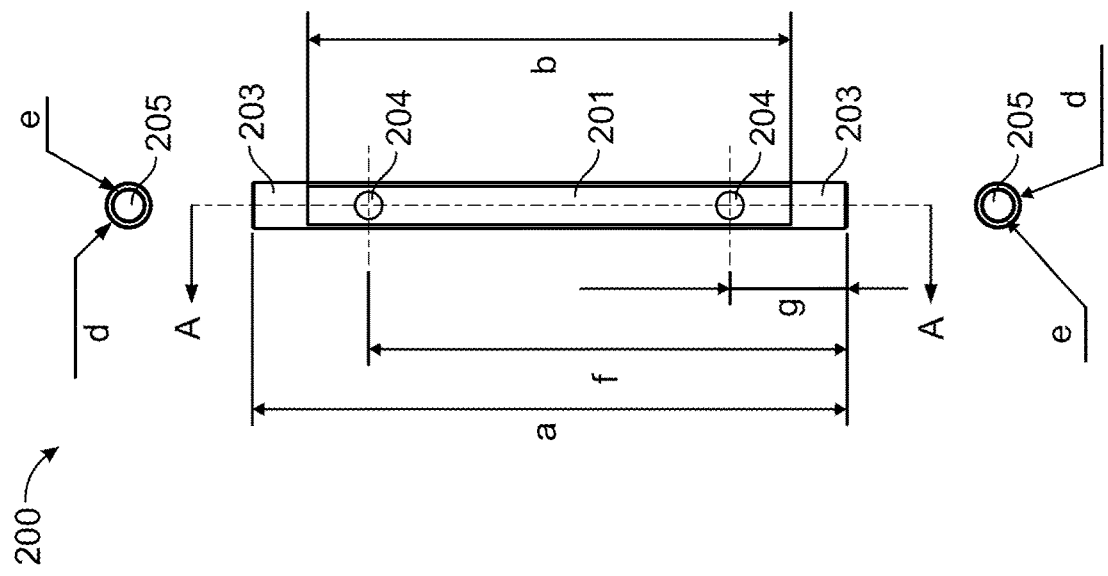

DIVIDER WALL ASSEMBLY INCLUDING COUPLING ROD AND COMPUTING SYSTEM INCLUDING THE SAME

CROSS-REFERENCE TO RELATED APPLICATIONS

This application claims priority from and benefit of U.S. Provisional Patent Application Ser. No. 63/495,452, filed on Apr. 11, 2023, titled "Design Of The Divider Wall To Solve Sheet Metal Bending Length Insufficient To Form The Fix Holes," which is hereby incorporated by reference herein in its entirety.

FIELD OF THE INVENTION

The present invention relates generally to a computing system having a divider wall assembly separating a space for placing electronic components in a housing, and more specifically, to a divider wall assembly including a plurality of sheets and a coupling rod fastened by fasteners inserted to through-holes of the plurality of sheets and through-holes of the coupling rod.

BACKGROUND OF THE INVENTION

In general, multiple electronic components are included in a housing of a computing system. For example, a computing system may include more than one power supply unit (PSU), and a divider wall is necessary to divide the internal space of the housing such that each PSU is placed at a designated space of the housing. Although the divider wall needs to be sturdy, the divider wall also needs to be as thin as possible not to take up too much space in the housing. Further, the divider wall needs to be fixed securely in the housing of the computing system. One way of fixing the divider wall to a frame of the housing is using a fastener such as a rivet or a screw that is inserted to a hole formed on the divider wall. In general, a sheet metal is used as a material for the divider wall.

To form a hole for receiving a fastener on the divider wall, it is necessary to reserve enough space for fasteners to be securely fixed to a housing. Usually, it is recommended to reserve at least 2 times the diameter of the holes on a sheet so that fasteners can be fully fixed to the housing. Generally, a size of a rivet is in a range of 2.6 mm to 3.4 mm. Therefore, a minimum width of 5.2 mm is required to rivet two sheet metals together. However, if the sheet metal should have at least 5.2 mm width, it will take up too much space in the housing. Further, extruded holes would require a larger space than the flat head rivets.

Referring to FIG. 1A, a sheet metal 100 commonly used in a computing system has a width (w) smaller than the required width indicated above. In general, the width (w) is about 3 mm. Therefore, it would be impossible or difficult to form holes for receiving fasteners on this sheet metal 100. As exemplified in FIGS. 1B and 1C, if such sheet metals 110, 120 are used to form a rivet hole or extruded hole thereon, there is insufficient space for it.

Therefore, a need exists for solving the problem of limited space on a sheet metal for forming holes to receive fasteners. A need also exists for providing holes for receiving fasteners in a limited space of a sheet metal without increasing the width or thickness of the sheet metal.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

In view of the above-described problem with the conventional sheets not having a sufficient space for having holes, the present application discloses a coupling rod that can be used to couple two sheets together. The coupling rod provides holes for receiving fasteners attaching a divider wall including the coupled sheets to a frame of a housing of a computing system. Thus, the sheets of the divider wall do not need to have holes thereon. The coupling rod makes it possible to provide lockable positions despite the limited space provided by the sheets. Therefore, use of wider sheets is not necessary to provide holes for receiving fasteners by providing the coupling rod sandwiched between the sheets.

According to certain aspects of the present disclosure, a computing system is disclosed. According to various embodiments, the computing system includes a housing configured to receive a plurality of electronic components, the plurality of electronic components including a first electronic component and a second electronic component; and a divider wall assembly mounted to the housing to separate the first electronic component from the second electronic component. The divider wall assembly includes a plurality of sheets including a first sheet and a second sheet, each sheet of the plurality of sheets having a sheet through-hole. The divider wall assembly further includes a coupling rod positioned between the first sheet and the second sheet, the coupling rod having a flat surface formed between cylindrical ends, the coupling rod having a rod through-hole on the flat surface. The rod through-hole is perpendicular to an axis of the coupling rod. The divider wall assembly further includes a fastener fixedly attaching the plurality of sheets and the coupling rod. The fastener is inserted through the sheet through-hole of each sheet and the rod through-hole.

In various embodiments, the fastener includes a rivet.

In various embodiments, at least one of the cylindrical ends of the coupling rod has an attachment hole, the attachment hole being parallel to the axis of the coupling rod. In some embodiments, another fastener attaches the divider wall to the housing, the another fastener being inserted in the attachment hole of the coupling rod. In some embodiments, an inner surface of the attachment hole is threaded. In some embodiments, the another fastener includes a screw.

In various embodiments, each sheet of the plurality of sheets has a plurality of sheet through-holes.

In various embodiments, the coupling rod has at least two rod through-holes. In some embodiments, the coupling rod has at least two flat surfaces formed between the cylindrical ends. In some embodiments, each of the at least two rod through-holes is positioned on a respective one of the two flat surfaces. In some embodiments, a distance between the flat surfaces is about 1.2 mm, about 1.3 mm, about 1.4 mm, about 1.5 mm, about 1.6 mm, about 1.7 mm, about 1.8 mm, about 1.9 mm, or about 2.0 mm. In some embodiments, the distance is about 1.6 mm.

In various embodiments, the one or more of the plurality of electronic components is a power supply unit (PSU).

In various embodiments, the cylindrical ends are symmetric.

In various embodiments, the coupling rod has a curved surface between the cylindrical ends.

In various embodiments, the coupling rod has two flat surfaces and two curved surfaces formed between the cylindrical ends.

In various embodiments, a diameter of each of the cylindrical ends and/or a width the flat surface is 3 mm or about 3 mm.

In various embodiments, the entire length of the coupling rod is 39.2 mm, about 39 mm, or in a range between 38.2 mm and 40.2 mm. In some embodiments, a length of the flat surface formed between the cylindrical ends is 31.8 mm, about 32 mm, or in a range between 30.8 mm and 32.8 mm. In some embodiments, a length of each of the cylindrical ends is 3.7 mm, about 3.7 mm, or in a range between 2.7 mm and 4.7 mm.

In various embodiments, the coupling rod is made of steel.

According to other aspects of the present disclosure, a method for separating electronic components of a computing system is disclosed. According to various embodiments, the method includes providing a housing configured to receive a plurality of electronic components, the plurality of electronic components including a first electronic component and a second electronic component; providing a plurality of sheets including a first sheet and a second sheet, each sheet of the plurality of sheets having a sheet through-hole; providing a coupling rod having a flat surface formed between cylindrical ends, the coupling rod having a rod through-hole on the flat surface; positioning the coupling rod between the first sheet and the second sheet; aligning the sheet through-hole of each of the plurality of sheets with the rod through-hole; inserting a fastener within the sheet through-hole of each of the plurality of sheets and the rod through-hole to attach the plurality of sheets and the coupling rod, the attachment of the plurality of sheets and the coupling rod forming a divider wall assembly; and attaching the divider wall assembly to the housing.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

FIGS. 3A and 3B are schematic diagrams of the coupling rod shown in FIGS. 2A and 2B, respectively, according to certain aspects of the present disclosure. FIG. 3B shows section A-A in FIG. 3A.

Figure 1C:
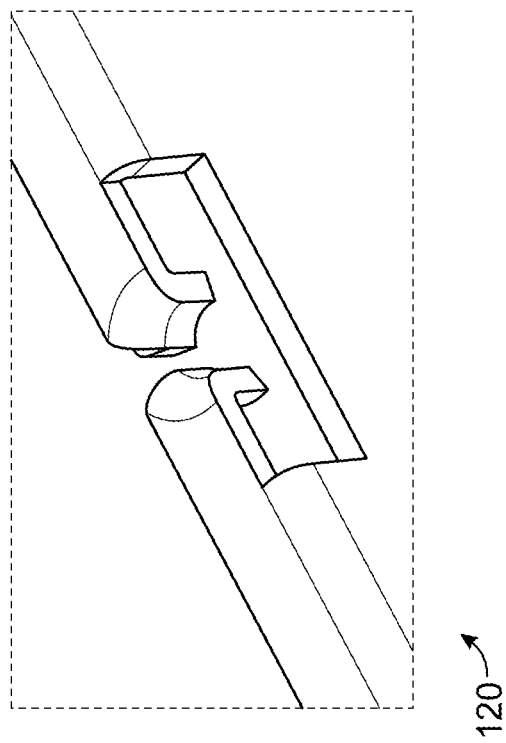
FIGS. 1A-1C are examples of prior art sheet metal.
Figure 1B:
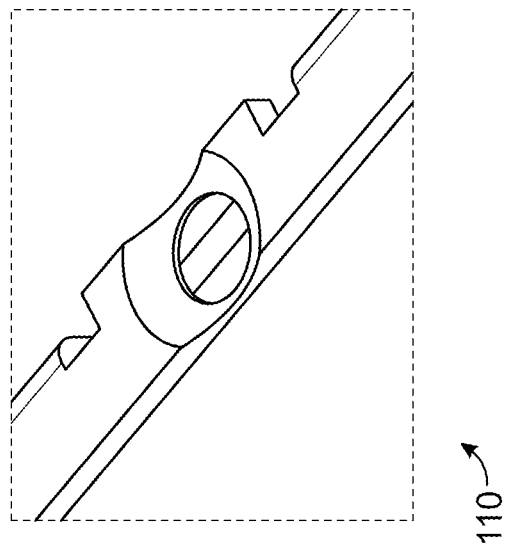
Figure 1A:
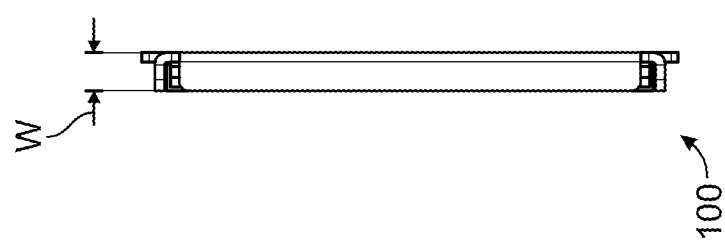

Elements in the figures are illustrated for simplicity and clarity and have not necessarily been drawn to scale. For example, the dimensions and/or relative positioning of some of the elements in the figures may be exaggerated relative to other elements to help improve understanding of various features.

While the present disclosure is susceptible to various modifications and alternative forms, specific implementations have been shown by way of example in the drawings and will be described in further detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially,"

"approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 2A:
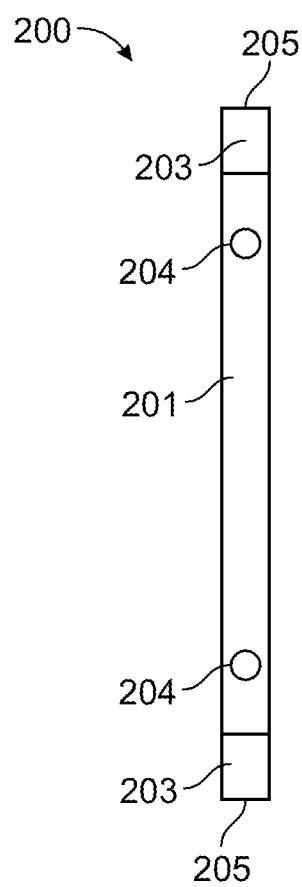
FIGS. 2A and 2B are a front view and a side view, respectively, of a coupling rod, according to certain aspects of the present disclosure.
Figure 2B:
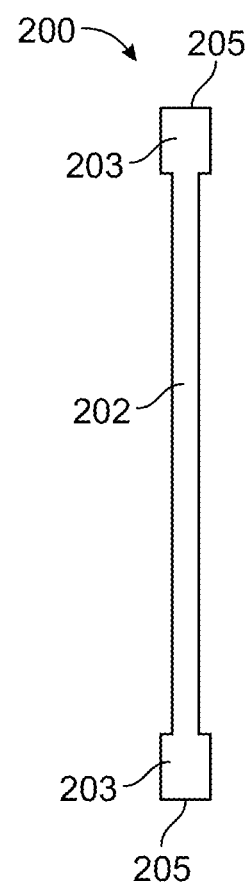

A coupling rod 200 according to various embodiments of the present invention is shown in FIGS. 2A and 2B. In some embodiments, the coupling rod 200 is made of steel. Referring to FIG. 2A showing the front view (that is the same as the rear view) of the coupling rod 200, the coupling rod 200 has a flat surface 201 formed between cylindrical ends 203. The coupling rod 200 also has at least one rod through-hole 204 on the flat surface 201. As shown in FIG. 2A, the rod through-hole 204 is perpendicular to an axis of the coupling rod 200. In some embodiments, the rod through-hole 204 is sized to receive a fastener 301. For example, the fastener 301 includes a rivet, as exemplified in FIGS. 4 and 5. The coupling rod 200 further has a curved surface 202, as shown in FIG. 2B showing the side view of the coupling rod 200.

In some embodiments, the coupling rod 200 is made by flattening portions of the sides of a cylindrical quick-cut steel, thus forming the flat surfaces 201 between the cylindrical ends 203 maintaining their original shape. Then, the rod through-holes 204 are formed on the flat surface 201. Thus, the width of the flat surface 201, which corresponds to the distance between two curved surfaces 202, is the same as the diameter of the cylindrical ends 203. As shown in FIG. 2B, the thickness of the portion of the coupling rod 200 between the cylindrical ends 203, which corresponds to the distance between two flat surfaces 202, is less than the diameter of the cylindrical ends 203. In some embodiments, two cylindrical ends 203 of the coupling rod 200 are identical such that the cylindrical ends 203 are symmetric.

In some embodiments, at least one of the cylindrical ends 203 of the coupling rod 200 has an attachment hole 205. The attachment hole 205 is parallel to the axis of the coupling rod 200. Thus, the attachment hole 205 is perpendicular to the rod through-holes 204. In some embodiments, the inner surface of the attachment hole 205 is threaded. In some embodiments, the attachment hole 205 is configured to receive a fastener 302. For example, the fastener 302 inserted into the attachment hole 205 includes a screw, as exemplified in FIG. 7A.

Dimensions of the coupling rod 200 is discussed referring to FIGS. 3A and 3B. Since the coupling rod 200 is used in a housing 501 of a computing system 500, the coupling rod 200 is generally sized to be included within the housing 501. An exemplary computing system 500 and its housing 501 are exemplified in FIGS. 7A and 7B.

In some embodiments, the entire length a of the coupling rod 200 is in a range between 38.2 mm and 40.2 mm. In some embodiments, the length a is about 39 mm. In some embodiments, the length a is 39.2 mm.

In some embodiments, the length b of the flat surface 201 formed between the cylindrical ends 203 is in a range between 30.8 mm and 32.8 mm. In some embodiments, the length b is about 32 mm. In some embodiments, the length b is 31.8 mm.

In some embodiments, the length c of each of the cylindrical ends 203 is in a range between 2.7 mm and 4.7 mm.

In some embodiments, the length c is about 3.7 mm. In some embodiments, the length c is 3.7 mm.

In some embodiments, the diameter d of each of the cylindrical ends 203 is about 3 mm. In some embodiments, the diameter d is 3 mm.

In some embodiments, the diameter e of the attachment hole 205 formed in each of the cylindrical ends 203 is about 2 mm. In some embodiments, the diameter e is 2 mm. In some embodiments, the attachment hole 205 formed in each of the cylindrical ends 203 is sized to receive an M2 screw or a screw having the outer diameter of about 2 mm or 2 mm.

In some embodiments, the distance f between the center of one of the rod through-holes 204 and the end of the coupling rod 200 is about 30 mm, about 30.5 mm, about 31 mm, about 31.5 mm, about 32 mm, or about 32.5 mm. In some embodiments, the distance f is 31.5 mm.

In some embodiments, the distance g between the center of another rod through-hole 204 and the end of the coupling rod 200 is about 7 mm, about 7.5 mm, about 7.7 mm, about 8 mm, or about 8.5 mm. In some embodiments, the distance g is 7.7 mm.

In some embodiments, the thickness h of the portion between the cylindrical ends 203 or the distance between the two flat surfaces 201 is about 1.5 mm, about 1.55 mm, about 1.6 mm, about 1.65 mm, or about 1.7 mm. In some embodiments, the thickness h is 1.6 mm.

In some embodiments, the depth i of the attachment hole 205 is about 3 mm. In some embodiments, the depth i is 3 mm.

Figure 4:
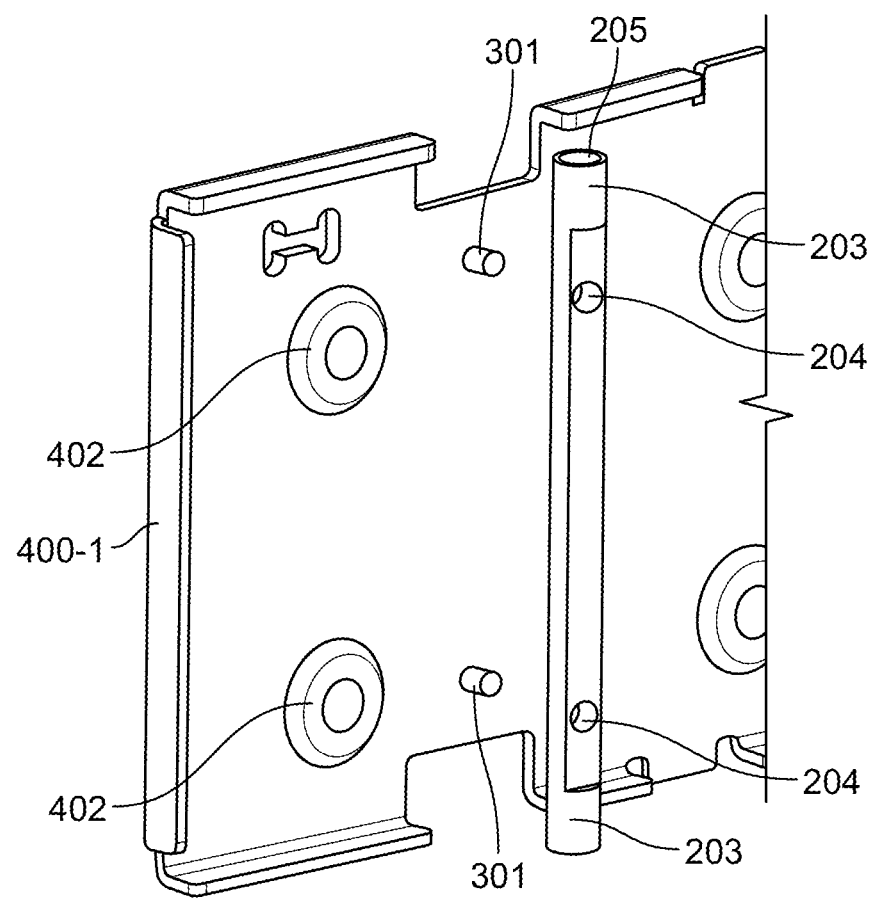
FIG. 4 shows coupling of a coupling rod to a sheet, according to certain aspects of the present disclosure.
Figure 5:
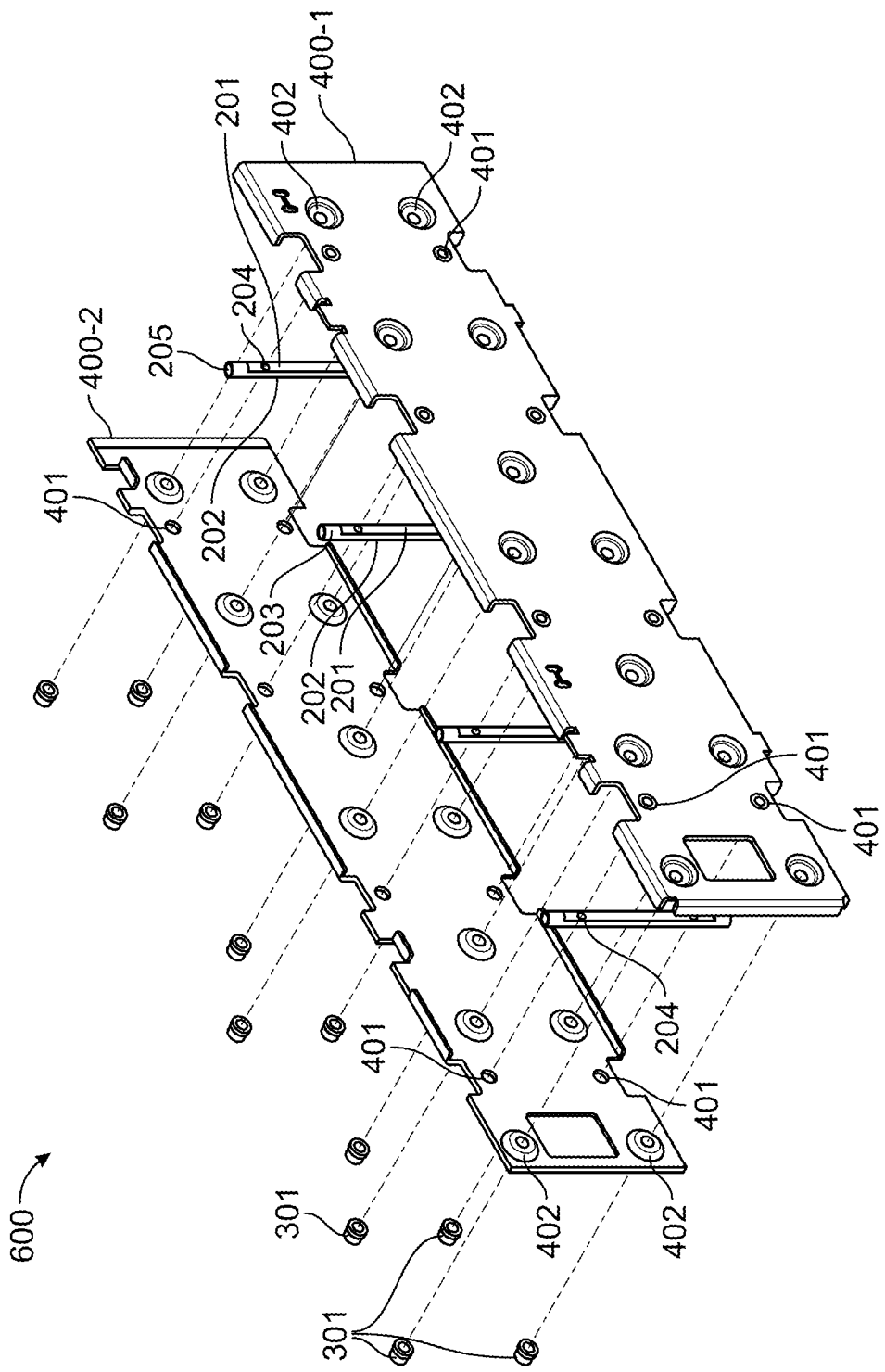
FIG. 5 is an exploded view of a divider wall assembly, according to certain aspects of the present disclosure.
Figure 6:
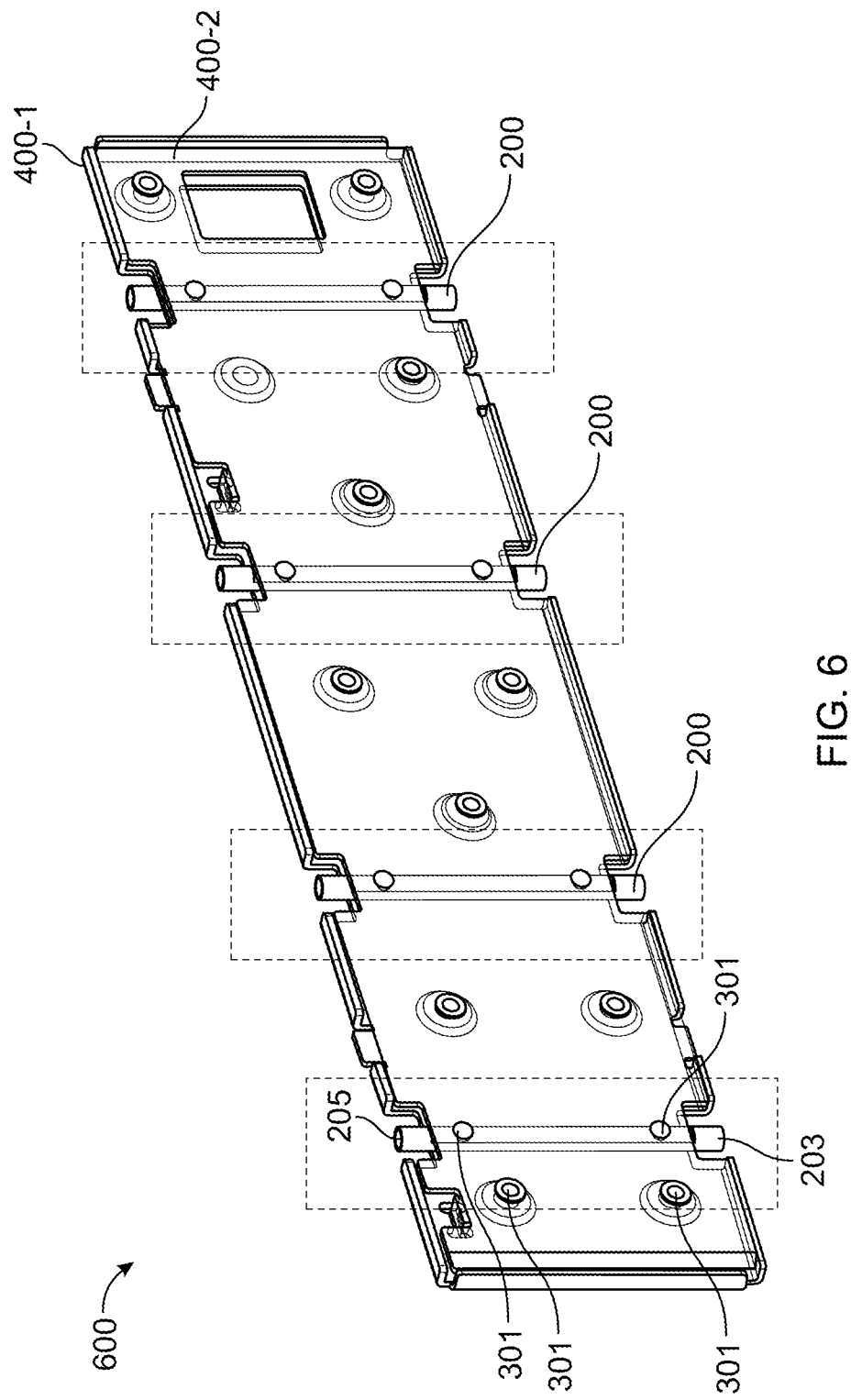
FIG. 6 shows a divider wall assembly, according to certain aspects of the present disclosure.

FIG. 4 shows coupling of the coupling rod 200 to a sheet 400-1 to form a divider wall assembly 600 shown in FIG. 6. In some embodiments, the sheet 400-1 is a sheet metal formed into a thin, flat piece. Sheet metal can be cut and bent into a variety of shapes, as exemplified in FIG. 4. In some embodiments, a sheet through-hole 401 is formed on the sheet 400-1, as shown in FIGS. 4 and 5. In some embodiments, a plurality of sheet through-holes 401 are formed on the sheet 400-1, the plurality of sheet through-holes 401 respectively corresponding to the rod through-holes 204 formed on the coupling rod 200. In some embodiments, a fastener 301 is inserted through the sheet through-hole 401 and the rod through-hole 204. When assembling the divider wall assembly 600, the coupling rod 200 is placed with respect to the sheet 400-1 such that the rod through-holes 204 are aligned with the sheet through-holes 401 such that the fasteners 301 pass through the corresponding sheet through-holes 401 and rod through-holes 204.

Referring to FIGS. 4-6, in some embodiments, sheets 400-1, 400-2 are shaped to have sections for exposing the cylindrical ends 203 when the flat surface 201 of the coupling rod 200 is placed to contact the inner surface of the sheets 400-1, 400-2. For example, each of the sections of the sheets 400-1, 400-2 for exposing the cylindrical ends 203 is formed by a gap created by cutting a portion of the top or bottom portion of the sheets 400-1, 400-2. Thus, the attachment holes 205 of the cylindrical ends 203 are easily accessible via the gap sections of the sheets 400-1, 400-2. See FIG. 6. In some embodiment, the thickness of the divider wall assembly 600 is same as or similar to the diameter d of the cylindrical ends 203. In some embodiment, the thickness of the divider wall assembly 600 is a little (0.5 mm, 1 mm, 1.5 mm, or 2 mm) smaller than the diameter d of the cylindrical ends 203. In some embodiment, the thickness of the divider wall assembly 600 is a little (0.5 mm, 1 mm, 1.5 mm, or 2 mm) greater than the diameter d of the cylindrical ends 203.

Referring to FIG. 5, to assemble the divider wall 600, a plurality of coupling rods 200 are placed between the two sheets 400-1, 400-2. In some embodiments, each of the sheets 400-1, 400-2 has a plurality of sheet through-holes 401 that respectively correspond to the rod through-holes 204 of the coupling rods 200. As shown in FIG. 5, the coupling rods 200 are spaced apart from each other. Although four coupling rods 200 are present between the sheets 400-1, 400-2 according to FIG. 5, the number of the coupling rods 200 may be less or more than four, depending on the arrangement of the corresponding sheet through-holes 401 formed on the sheets 400-1, 400-2. When the sheet through-holes 401 of the sheets 400-1, 400-2 and rod through-holes 204 of the coupling rods 200 placed between the sheets 400-1, 400-2 are aligned, fasteners 301 are inserted through the aligned holes 401, 204 to couple the two sheets 400-1, 400-2 with the coupling rods 200 placed therebetween. In some embodiments, the fasteners 301 are rivets.

In some embodiments, in addition to the sheet through-holes 401, the sheets 400-1, 400-2 have additional through-holes 402 that allow penetration of fasteners 301 through the through-holes 402 without having rod through-holes 204 therebetween. In some embodiments, each of the through-holes 402 is extended by a protrusion protruding inward, the through-hole 402 formed centrally at the protrusion, as exemplified in FIG. 5. In some embodiments, the protrusion contacts the counterpart protrusion when the divider wall 600 is assembled such that a fastener 301 penetrates the two corresponding through-holes 402. In some embodiments, the thickness of the two contacting protrusions with the through-holes 402 more or less corresponds to the thickness h of the coupling rod 200 located between the sheets 400-1, 400-2. In some embodiments, the same fasteners 301 are used for both sheet through-hole 401 and additional through-holes 402, as exemplified in FIGS. 5 and 6. In some embodiments, fasteners used for the sheet through-hole 401 and fasteners used for additional through-holes 402 are different.

Referring to FIG. 6, the length a of the coupling rod 200 is more or less same as the height of the sheets 400-1, 400-2. Thus, the ends of the cylindrical ends 203 of the coupling rod 200 that are exposed between the sheets 400-1, 400-2 are more or less aligned with the top end and the bottom end of the sheets 400-1, 400-2. This configuration of the divider wall assembly 600 provides attachment holes 205 for coupling the divider wall 600 to a frame of the housing 501 even without forming attachment holes on the sheets 400-1, 400-2.

Figure 7A:
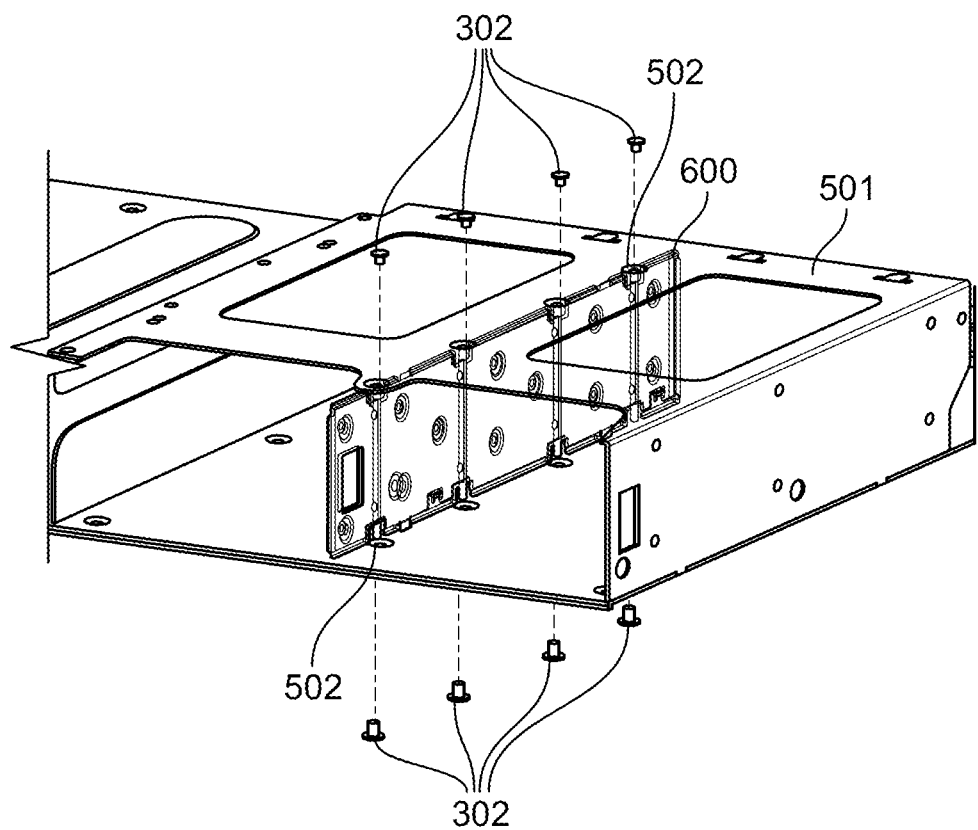
FIG. 7A is a perspective view of a housing of a computing system including a divider wall, according to certain aspects of the present disclosure.

Referring to FIG. 7A, the housing 501 of a computing system 500 has through-holes 502 formed thereon, for example, at the top and bottom of the housing 501. When the divider wall assembly 600 is placed within the housing 501, the attachment holes 205 of the coupling rods 200 are aligned with the through-holes 502 of the housing 501 and fasteners 302 are inserted thereto to fix the divider wall 600 within the housing 501. In some embodiments, the fasteners 302 include screws.

Figure 7B:
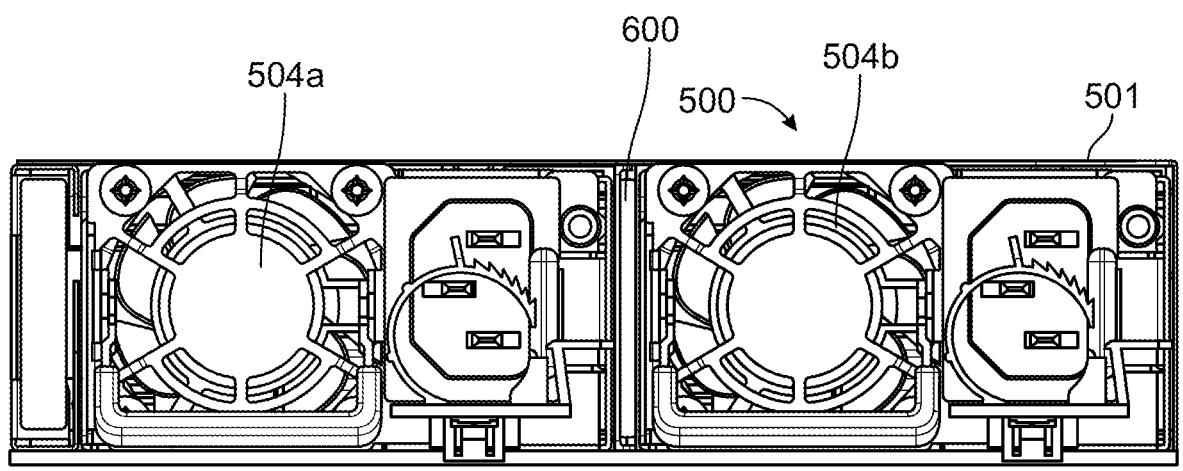
FIG. 7B is a front view of a computing system including a divider wall and power supply units, according to certain aspects of the present disclosure.

Referring to FIG. 7B, the computing system 500 has the housing 501 divided by the divider wall 600 into two separate areas such that an electronic component such as PSU is placed in each area of the housing 501. By using the coupling rod 200 providing attachment holes 205 in the divider wall assembly 600, the sheets 400-1, 400-2 of thin width/thickness can be used without increasing the space the divider wall assembly 600 takes up within the internal space of the housing 501. This is possible because the sheets 400-1, 400-2 themselves do not need to have attachment holes for fixing the divider wall 600 to the housing 501. The coupling rod 200 placed between the sheets 400-1, 400-2 provides the attachment hole 205 without requiring much space within the housing 501.

In various embodiments, a method for separating electronic components of a computing system includes providing a housing 501 configured to receive a plurality of electronic components 504. For example, the plurality of electronic components 504 includes a first electronic component 504a and a second electronic component 504b, as shown in FIG. 7B. The method further includes providing a plurality of sheets including a first sheet 400-1 and a second sheet 400-2, each sheet of the plurality of sheets having a sheet through-hole 401. The method further includes providing a coupling rod 200 having a flat surface 201 formed between cylindrical ends 203, the coupling rod having a rod through-hole 204 on the flat surface. The method further includes positioning the coupling rod 200 between the first sheet 400-1 and the second sheet 400-2. The method further includes aligning the sheet through-hole 401 of each of the plurality of sheets 400-1, 400-2 with the rod through-hole 204. The method further includes inserting a fastener 301 within the sheet through-hole 401 of each of the plurality of sheets 400-1, 400-2 and the rod through-hole 204 to attach the plurality of sheets 400-1, 400-2 and the coupling rod 200, the attachment of the plurality of sheets and the coupling rod forming a divider wall assembly 600. The method further includes attaching the divider wall assembly 600 to the housing 501, as shown in FIG. 7A. In some embodiments, the method further includes placing the first and second electronic components 504a and 504b, respectively, such as PSUs, in their respective spaces generated by the divider wall 600 in the housing 501, as shown in FIG. 7B.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this disclosure belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computing system comprising:
   a housing configured to receive a plurality of electronic components, the plurality of electronic components including a first electronic component and a second electronic component; and
   a divider wall assembly mounted to the housing to separate the first electronic component from the second electronic component, the divider wall assembly including
      a plurality of sheets including a first sheet and a second sheet, each sheet of the plurality of sheets having a sheet through-hole,
      a coupling rod positioned between the first sheet and the second sheet, the coupling rod having a flat surface formed between cylindrical ends, the coupling rod having a rod through-hole on the flat surface, the rod through-hole being perpendicular to an axis of the coupling rod, and
      a fastener fixedly attaching the plurality of sheets and the coupling rod, the fastener being inserted through the sheet through-hole of each sheet and the rod through-hole;
   wherein at least one of the cylindrical ends of the coupling rod has an attachment hole, the attachment hole being parallel to the axis of the coupling rod.

2. The computing system of claim 1, wherein the fastener comprises a rivet.

3. The computing system of claim 1, wherein another fastener attaches the divider wall assembly to the housing, the another fastener being inserted in the attachment hole of the coupling rod.

4. The computing system of claim 3, wherein an inner surface of the attachment hole is threaded.

5. The computing system of claim 4, wherein the another fastener comprises a screw.

6. The computing system of claim 1, wherein each sheet of the plurality of sheets has a plurality of sheet through-holes.

7. The computing system of claim 1, wherein the coupling rod has at least two rod through-holes.

8. The computing system of claim 7, wherein the coupling rod has at least two flat surfaces formed between the cylindrical ends.

9. The computing system of claim 8, wherein each of the at least two rod through-holes is positioned on a respective one of the two flat surfaces.

10. The computing system of claim 8, wherein a distance between the flat surfaces is about 1.2 mm, about 1.3 mm, about 1.4 mm, about 1.5 mm, about 1.6 mm, about 1.7 mm, about 1.8 mm, about 1.9 mm, or about 2.0 mm.

11. The computing system of claim 10, wherein the distance is about 1.6 mm.

12. The computing system of claim 1, wherein the one or more of the plurality of electronic components is a power supply unit (PSU).

13. The computing system of claim 1, wherein the cylindrical ends are symmetric.

14. The computing system of claim 1, wherein the coupling rod has a curved surface between the cylindrical ends.

15. The computing system of claim 1, wherein the coupling rod has two flat surfaces and two curved surfaces formed between the cylindrical ends.

16. The computing system of claim 1, wherein a diameter of each of the cylindrical ends and/or a width the flat surface is 3 mm or about 3 mm.

17. The computing system of claim 1, wherein:
   the entire length of the coupling rod is 39.2 mm, about 39 mm, or in a range between 38.2 mm and 40.2 mm;
   a length of the flat surface formed between the cylindrical ends is 31.8 mm, about 32 mm, or in a range between 30.8 mm and 32.8 mm; and/or
   a length of each of the cylindrical ends is 3.7 mm, about 3.7 mm, or in a range between 2.7 mm and 4.7 mm.

18. The computing system of claim 1, wherein the coupling rod is made of steel.

19. A method for separating electronic components of a computing system, the method comprising:
   providing a housing configured to receive a plurality of electronic components, the plurality of electronic components including a first electronic component and a second electronic component;
   providing a plurality of sheets including a first sheet and a second sheet, each sheet of the plurality of sheets having a sheet through-hole;
   providing a coupling rod having a flat surface formed between cylindrical ends, the coupling rod having a rod through-hole on the flat surface, at least one of the cylindrical ends having an attachment hole that is parallel to an axis of the coupling rod;
   positioning the coupling rod between the first sheet and the second sheet;
   aligning the sheet through-hole of each of the plurality of sheets with the rod through-hole;
   inserting a fastener within the sheet through-hole of each of the plurality of sheets and the rod through-hole to attach the plurality of sheets and the coupling rod, the attachment of the plurality of sheets and the coupling rod forming a divider wall assembly; and
   attaching the divider wall assembly to the housing.

\* \* \* \* \*